United States Patent
Svendsen et al.

(10) Patent No.: US 7,363,258 B2
(45) Date of Patent: Apr. 22, 2008

(54) METHOD AND SYSTEM FOR DISTRIBUTING AFFILIATE IMAGES IN A PEER-TO-PEER (P2P) PHOTOSHARING NETWORK THROUGH AFFILIATE BRANDING

(75) Inventors: Hugh B. Svendsen, Chapel Hill, NC (US); Rick Thompson, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 425 days.

(21) Appl. No.: 10/854,084

(22) Filed: May 24, 2004

(65) Prior Publication Data

US 2004/0215625 A1  Oct. 28, 2004

(51) Int. Cl.
*G06F 17/30* (2006.01)

(52) U.S. Cl. .......................................... 705/27; 705/26

(58) Field of Classification Search ................. 705/26, 705/27
See application file for complete search history.

(56) References Cited

U.S. PATENT DOCUMENTS

| | | | |
|---|---|---|---|
| 6,999,111 B2* | 2/2006 | McIntyre et al. | 348/207.1 |
| 7,231,359 B2* | 6/2007 | Parulski | 705/26 |
| 2003/0154099 A1* | 8/2003 | Tuijn et al. | 705/1 |
| 2003/0195802 A1 | 10/2003 | Hensen et al. | |
| 2004/0215625 A1* | 10/2004 | Svendsen et al. | 707/10 |
| 2005/0216302 A1 | 9/2005 | Raji et al. | |
| 2006/0044599 A1* | 3/2006 | Lipowitz et al. | 358/1.15 |

OTHER PUBLICATIONS

Rimin Dutt, "Virtual design for living; Imaging doftware creates preview for decorating", telegram & Gazette, Dec. 2, 2002.*

* cited by examiner

*Primary Examiner*—Mark Fadok
(74) *Attorney, Agent, or Firm*—Withrow & Terranova, PLLC

(57) ABSTRACT

The invention provides a method and system for distributing affiliate images in a peer-to-peer (P2P) photosharing network comprising multiple peer nodes and a peer server, wherein each of the peer nodes execute a peer application that allows the peer nodes to communicate with each other and with the peer server over a network. Aspects of the present invention include customizing the peer application for the affiliate by branding the peer application with brand identifiers of the affiliate and by bundling low-resolution images of the affiliate with the customized peer application. Thereafter, the customized peer application is distributed directly to the fan base of the corresponding affiliate. During execution of the customized peer application, a user may place an order for merchandise imprinted with at least one of the low-resolution images. When the order is subsequently processed by the peer server, any low-resolution image in the order is replaced with its corresponding high-resolution image for final printing.

25 Claims, 2 Drawing Sheets

METHOD AND SYSTEM FOR DISTRIBUTING AFFILIATE IMAGES IN A PEER-TO-PEER (P2P) PHOTOSHARING NETWORK THROUGH AFFILIATE BRANDING

FIELD OF THE INVENTION

The present invention relates to online photosharing, and more particularly to a method and system for distributing affiliate images in a peer-to-peer (P2P) photosharing network through affiliate branding.

BACKGROUND OF THE INVENTION

Over the past several years, photosharing has become widely accepted by photo enthusiasts. Many websites currently exist that allow users to upload digital images to the site for storage on a server and for viewing by others over the Internet. Services offered by photosharing websites for which users are charged a fee are also increasing. For example, many photosharing sites enable users to send electronic greeting cards to a specified recipient or to order products such as coffee mugs, mouse pads, and T-shirts, on which a selected image is imprinted.

An example of an online greeting card system is U.S. Pat. No. 5,426,594 issued to Wright et al. Wright discloses an electronic greeting card store and communication system in which one user of a wireless portable device, called a personal communicator, can send a user of another device an electronic greeting card through an electronic mail server. In operation, a collection of electronic greeting cards is stored in the memory of the personal communicator in low resolution. The user of the personal communicator views the low resolution images of the electronic greeting cards, makes a selection based on those low resolution images, designates a destination, and then instructs the personal communicator to send the request message to the electronic mail communication system.

The electronic mail server stores the corresponding high resolution images. When the mail server receives the request message, the mail server wirelessly transmits a high resolution electronic greeting card message to the specified personal communicator for display to a user. Wright also describes that different greeting card stores provide the high and low resolution images to the greeting card system.

One advantage of Wright's system is that it may help prevent theft and counterfeiting because the user of the personal communicator that stores the low resolution greeting card images does not have access to the high resolution images ultimately sent to the receiving parties. However, Wright's system has several disadvantages as well.

One of the main goals of a photosharing site is not only to obtain users, but also to entice the users to pay for services offered by the photosharing site. However, Wright's system may face obstacles in obtaining users without relying on heavy advertising because the users must first be made aware of the existence of the greeting card site, go online and consciously navigate to the site, and then download the low resolution greeting card images to their personal devices. It is well-known in the online community that requiring the user to perform a download prior to placing an order will result in a significant percentage of lost customers, which results in lost revenues.

Another primary goal of photosharing sites is to entice businesses to make their digital photos available on the site in the hope that users will pay a fee to use the images in some fashion, such as by sending electronic postcards and making prints and other photo creations. However, in Wright's system, even if one assumes that the user finds the greeting card site and then downloads the low resolution greeting card database, there is no guarantee that the user will actually select a greeting card from any particular greeting card company.

In summary, the disadvantages of Wright's system include a failure to attract users to the greeting card site absent heavy advertising; the requirement that the user has to download the low resolution cards in most cases; and little guarantee that the cards of a particular greeting card company will be selected by users. Due to these disadvantages, there is little incentive for a greeting card company to participate in the greeting card site. This ultimately results in lost revenues for both the greeting card site and the greeting card company.

Accordingly, what is needed is an improved method and system for distributing images. The method and system should encourage photo-rich entities to participate in an online photosharing system based on the prospect of increased revenue generated by their digital images. The present invention addresses such a need.

SUMMARY OF THE INVENTION

The present invention provides a method and system for distributing affiliate images in a peer-to-peer (P2P) photosharing network comprising multiple peer nodes and a peer server, wherein each of the peer nodes execute a peer application that allows the peer nodes to communicate with each other and with the peer server. Aspects of the present invention include customizing the peer application for each affiliate by branding the peer application with brand identifiers of the affiliate and by bundling low-resolution versions of the affiliate's images with the customized peer application. Thereafter, the customized peer application is distributed directly to the fan base of the corresponding affiliate. During execution of the customized peer application, a user may place an order for merchandise imprinted with at least one of the low-resolution images. When the order is subsequently processed by the peer server, any low-resolution image in the order is replaced with its corresponding high-resolution image for final printing.

According to the method and system disclosed herein, the direct distribution of the customized peer application to fans of the corresponding affiliate ensures that the images of the affiliate reach the target audience. By distributing the low resolution versions of the image with the peer application, the need for the user to download the thumbnail images is eliminated. This not only reduces bandwidth requirements, but also removes an obstacle for users to use the services provided by the P2P network. Another benefit of distributing the thumbnail images with the customized peer application is that it reduces the space required for the peer owner to store the images, particularly if the customized peer application distributed on compact disc (CD). By charging a fee for such services, and obtaining high-demand images from the affiliates, the P2P photosharing service should observe an increase in revenue for both the photosharing service and the affiliates, thereby enticing affiliates to join the network.

DETAILED DESCRIPTION OF THE INVENTION

The present invention relates to a peer-to-peer photosharing service that customizes the peer software for each affiliate. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a method and system of distributing third party images in a peer-to-peer (P2P) photosharing network that entices entities with high-demand images to participate in online photosharing system, thereby increasing revenue for both the photosharing site and the entities providing the images. According to one aspect of the present invention, the mechanism for distributing the images is a photosharing system based on a peer-to-peer network. The present invention takes advantage of the fact that the peer-to-peer network requires users to download client software to their computers for communication with other peers and a peer server.

Figure 1:
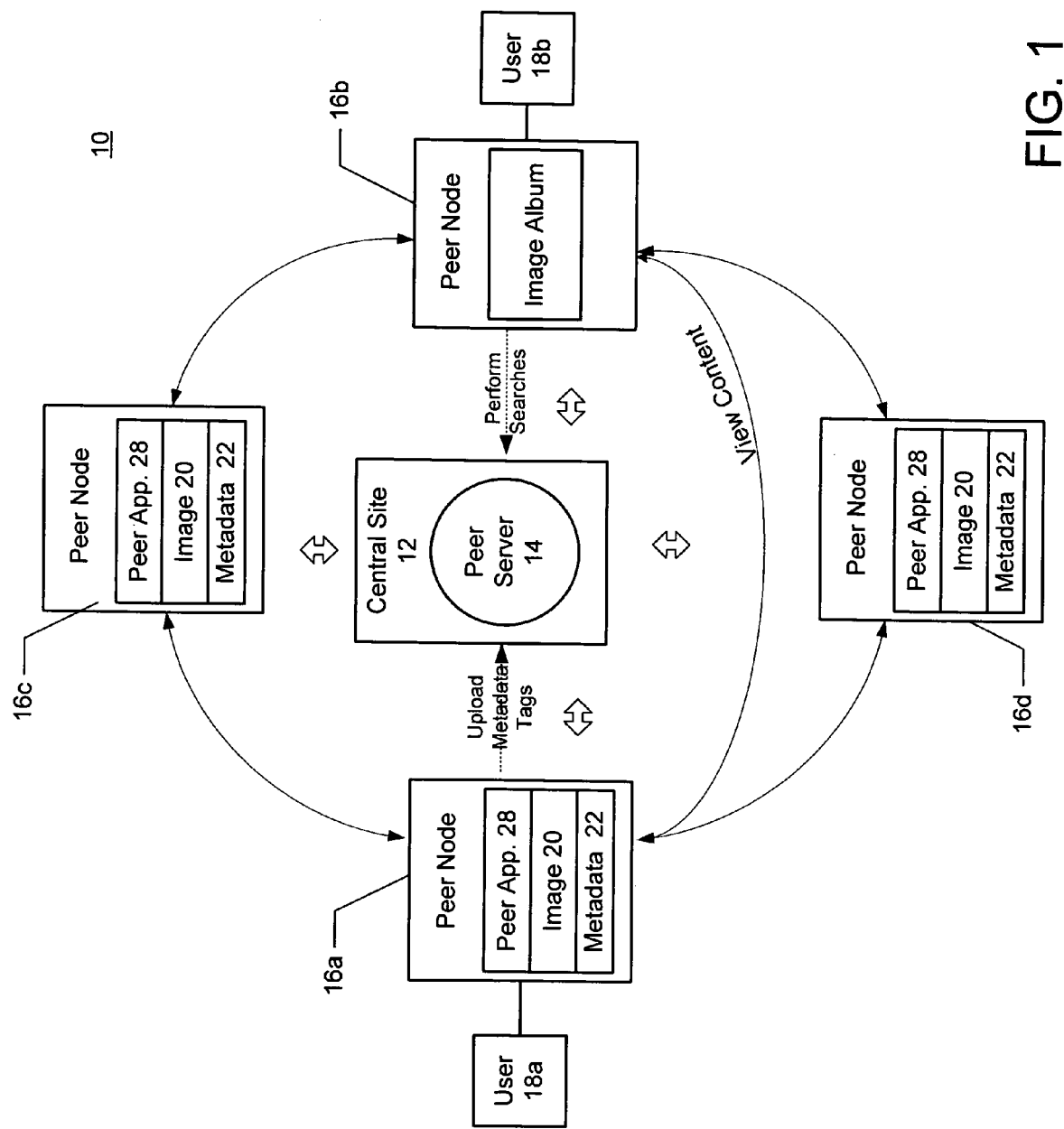
FIG. 1 is a block diagram illustrating a peer-to-peer (P2P) photosharing system in accordance with a preferred embodiment.

FIG. 1 is a block diagram illustrating a peer-to-peer (P2P) photosharing system in accordance with a preferred embodiment. According to the present invention, the system 10 includes a peer photosharing website 12 that includes a peer server 14, and multiple peer nodes 16a-16d (collectively referred to as peer nodes 16). The peer nodes 16 require the installation of a peer application 28, which when executed, enables the peer nodes 16 to communicate with other nodes 16 and with the peer server 14 a network, such as the Internet. In a preferred embodiment, users 18 may also access the peer site 12 from devices or clients (not shown) that are not peer nodes 16, using a standard web browser.

In a preferred embodiment, the peer nodes 16 may each represent either a website or a computer, and typically store the digital images 20 of a particular user 18. A peer node 16 may store the images 20 of more than one user 18. For example, two family members that share a home PC, but manage their images separately, may maintain separate accounts with the system 10 on the shared PC. The digital images 20 are stored as image files that include image data. Each image also has metadata 22 associated with it that describe and categorize the image. The metadata 22 may be associated with the images 20 by the user 18 or automatically by the peer node 16. In addition, some or all of the metadata 22 may be associated with the image by a digital camera at the time of image capture. Each image 20 may also be associated with a particular type of metadata, which is a smaller representation of the image data, called a thumbnail image 24.

The photosharing system 10 is in contrast to the traditional photosharing model where the user 18 would post digital images by uploading the images from his or her computer to a webserver for storage in a static album. Instead, in the photosharing system 10, the peer nodes 16 maintain storage of the actual image data and only the metadata 22 (and, in particular, the thumbnail image) for each image are uploaded to the peer server 14. In a preferred embodiment, uploading of the thumbnails and metadata is optional.

In operation, users 18 become members of the P2P photosharing service by downloading and installing the peer application 28 that communicates with the server and enables the user's computer to become a peer in the P2P network. Users 18 of the peer nodes 16 register themselves and their peer nodes 16 with the peer server 14 to become members of the service so that other users 18 can search for and view their images 20. The user 18 may share images 20 that are local on the user's peer node 16 with the photosharing site 12 by uploading the image metadata 22, which synchronizes the peer node 16 and the peer server 14. The peer server 14 maintains a list of users 18 and peer nodes 16, and provides a search engine and a cache of the metadata for each shared image. Users 18 enter search terms to find desired images, and in response the server 14 displays a list of thumbnail images 24 in the network matching the search criteria. Whichever images 20 are selected by the user from the list are then downloaded to the user's peer nodes 16 directly from the peer nodes 16 hosting the images 20. Users 18 may then place orders with the server 14 for print creations created from one or more of the selected images 20.

The present invention provides a method and system for distributing affiliate images through the P2P photosharing network in a manner that allows business entities that have image assets to monetize those asset safely, without fear that the original versions of the images will be stolen, or that users will acquire the images and print these images at home instead of printing them through the photosharing network. The present invention also ensures that the images of the entity are placed in the hands of the users who would find the images of interest and be willing to pay a fee to make prints or photo creations.

The present invention accomplishes this through affiliate branding of the client software with the goal of increasing the revenue of an online peer-to-peer photosharing system 10. According to the present invention, a customized version of the peer application is created by re-branding the application 28 with the logos and trademarks of the entity and bundled with thumbnails of original high-resolution images of the affiliate. Example organizations that fit this profile include Sports Illustrated (photos of swimsuit models), NASCAR (photos of drivers & cars), pro sports teams, and Disneyland. Basically, any entity that has strong brand recognition and a loyal following of fans who would find images related to the entity highly desirable are candidates for becoming affiliates of the photosharing system. The customized application and the thumbnails are then distributed (typically by CD or through download) to the fan base of the corresponding affiliate. After installation of the customized application, the user 18 of peer 16 interacts with the thumbnail versions to order prints or to make photo creations. During execution of the customized application, the application displays the thumbnails and enables the user to place an order for merchandise imprinted with one or more of the thumbnails. When the order is received by the peer server 14, the peer server 14 replaces the thumbnails with the corresponding high-resolution images for final printing.

The advantages of the present invention include the fact that the direct distribution of the customized peer application to fans of the corresponding affiliate ensures that the images of the affiliate reach the target audience. By distributing the low resolution versions of the image with the peer application, the need for the user to download the thumbnail images is eliminated. This not only reduces bandwidth requirements, but also removes an obstacle for users to use the services provided by the P2P network 10. Another benefit of distributing the thumbnail images with the peer application is that it reduces the space required for the peer owner to store the images. If the peer software is distributed electronic media (CD for example), then this also means that we will be able to fit more images on the CD. By charging a fee for such services, and obtaining high-demand images from the affiliates, the P2P photosharing service should observe an increase in revenue for both the photosharing service and the affiliates.

Figure 2:
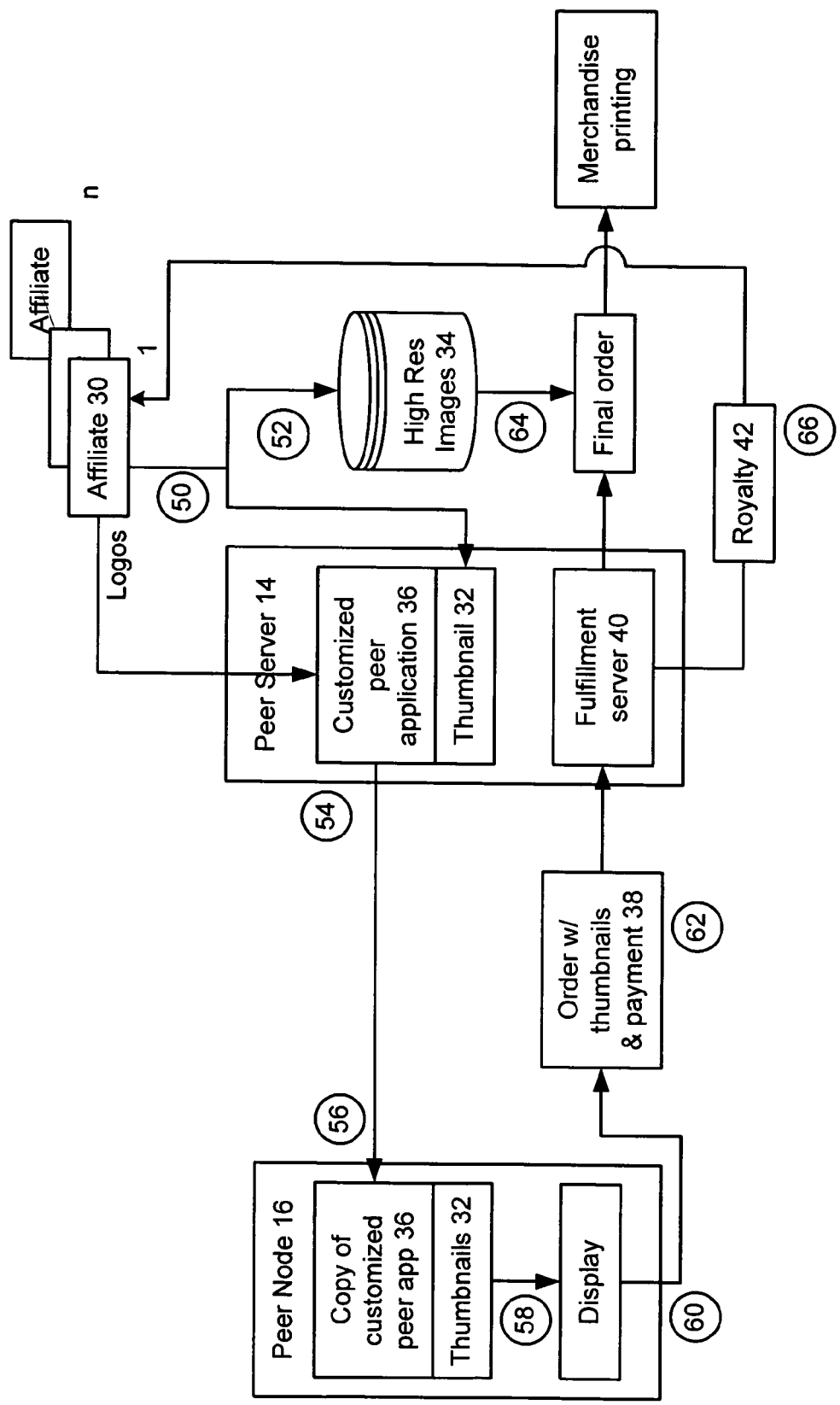
FIG. 2 is a flow diagram illustrating the process for distributing affiliate images in the P2P photosharing network that enables users to order photo creations imprinted with the affiliate images.

FIG. 2 is a flow diagram illustrating the process for distributing affiliate images in the P2P photosharing network that enables users to order photo creations imprinted with the affiliate images. In a preferred embodiment of the present invention, the process assumes that an affiliate relationship has been established between the P2P photosharing service 10 and one or more third party entities that have images that are in high-demand by certain users, such that the entities become affiliates 30 of the network 10. Once an entity becomes an affiliate 30, the affiliate 30 provides the photosharing service with low-resolution and high-resolution versions of their images (step 50). The affiliate's high-resolution images 34 are preferably stored in a database accessible by the peer server (step 52). The low-resolution images (thumbnails) may also be stored in the database.

In accordance with present invention, customized peer applications 36 are then created for each affiliate 30 by branding the original peer application 28 with the brand identifiers of the corresponding affiliate 30 and by bundling the affiliate's thumbnail images 32 with the customized application (step 54). In a preferred embodiment, brand identifiers include the name, trademarks and/or logos of the affiliate, and the brand identifiers may be placed on the packaging (including the CD), manuals, and screens of the customized peer application 36. The client application 36 may also be customized by including links to the affiliate's web site(s) and by including special offers and discounts.

After the customized peer applications 36 are prepared, copies of the customized peer applications 36 (including the thumbnails) are distributed to the corresponding affiliate's fan base (step 56). For example, CDs of the client application 36 customized for NASCAR may be distributed to attendees of NASCAR events, and CDs of the client application 36 customized for Disneyland may be disputed to Disneyland customers. In an alternative to physical delivery on CDs, the customized applications 36 may be distributed by informing the affiliate's fan base of a URL from which the corresponding customized application 36 may be downloaded (e.g., from the peer server 14 or directly from the affiliate 30). After the customized peer application 36 is installed, updates to the peer application 36 can be automatically downloaded from the peer server 14, including additional affiliate thumbnails 32.

During execution, the peer application 36 displays the thumbnail images 32 to the user, preferably in album format (step 58). The user may then select one or more of the thumbnail images, and optionally import and select their own images, for which to purchase merchandise made with images (step 60). As is well-known in the art, in response, the peer application 36 displays a payment dialog box prompting the user to enter credit card information prior to sending the print order to the peer server 14.

The peer node 16 then sends the order 38 along with the payment information to the peer server 14 (step 62). In a preferred embodiment, the order includes the metadata 22 identifying the selected thumbnails 32 and any high-resolution images selected by the user. At the peer server 14, the order 38 is preferably processed by a fulfillment server 40. The fulfillment server 40 examines the metadata 22 in the order and replaces any specified affiliate thumbnails 32 with the corresponding high-resolution images 34 for merchandise printing (step 64). Finally, the photosharing service may pay a royalty 42 to the affiliate 30 based on the use of the images (step 66), whereby the metadata 22 enables the peer server 14 to keep track of which images of which affiliates 30 were ordered. The payment of the royalty 42 based on usage in this context may include a payment based on the number of images distributed by the photosharing service, the number of copies distributed, and/or a per image fee for each image that was printed.

A method and system for distributing affiliate images in a peer-to-peer (P2P) photosharing network through affiliate branding has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for distributing affiliate images in a peer-to-peer (P2P) photosharing network comprising multiple peer nodes and a peer server, wherein each of the peer nodes execute a peer application that allows the peer nodes to communicate with each other and with the peer server over a network, the method comprising:

customizing the peer application for an affiliate by branding the peer application with brand identifiers of the affiliate and by bundling low-resolution images of the affiliate with the customized peer application;

distributing the customized peer application to a fan base of the affiliate;

during execution of the customized peer application, allowing a user to place an order for merchandise imprinted with at least one of the low-resolution images; and when processing the order by the peer server, replacing any low-resolution image with a corresponding high-resolution image for final printing.

2. The method of claim 1 wherein branding the peer application further includes:

placing logos and trademarks of the affiliate on the peer application.

3. The method of claim 1 wherein branding the peer application further includes: placing the brand identifiers on any combination of packaging, manuals, and screens of the customized peer application.

4. The method of claim 3 further including: customizing the peer application by including links to the affiliate's web site(s).

5. The method of claim 1 further including: providing to the peer server by the affiliate, high-resolution versions of the low-resolution images for replacement of the low-resolution images for final printing.

6. The method of claim 5 further including: storing the affiliate's high-resolution images in a database accessible by the peer server.

7. The method of claim 1 further including: after the customized peer application is installed by the user, automatically downloading updates to the peer application from the peer server, including additional affiliate low-resolution images.

8. The method of claim 1 wherein during execution, the customized peer application displays the low-resolution images in an album format.

9. The method of claim 8 further including: allowing the user to select one or more of the low-resolution images and import and select their own images.

10. The method of claim 1 further including: metadata identifying selected low-resolution images in the order.

11. The method of claim 10 further including: processing the order by examining the metadata in the order and replacing any specified low-resolution images with corresponding high-resolution images for merchandise printing.

12. The method of claim 1 further including: paying the affiliate a royalty based on usage of the affiliate images.

13. A system for distributing images of affiliates in a peer-to-peer (P2P) photosharing network, the network comprising:
multiple peer nodes, each executing a custom version of a peer application that allows the peer nodes to communicate in the network, the peer application being customized for each affiliate by branding the peer application with brand identifiers of the affiliate and by bundling low-resolution images of the affiliate with the customized peer application, wherein copies of the customized peer application are distributed to a fan base of the affiliate, and installed on user computers, resulting in the user computers becoming peer nodes, the customized peer application including instructions for allowing a user to place an order for merchandise imprinted with at least one of the low-resolution images; and
a peer server for receiving and processing the orders from the peer nodes, wherein the peer server replaces any low-resolution image specified in the order with a corresponding high-resolution image for final printing.

14. The system of claim 13 wherein the peer application is branded by placing logos and trademarks of the affiliate on the peer application.

15. The system of claim 13 wherein the peer application is branded by placing the brand identifiers on any combination of packaging, manuals, and screens of the customized peer application.

16. The system of claim 15 wherein the peer application is customized by including links to the affiliate's web site(s).

17. The system of claim 13 wherein the affiliate provides the peer server with high-resolution versions of the low-resolution images for replacement of the low-resolution images for final printing.

18. The system of claim 17 wherein the affiliate's high-resolution images are stored in a database accessible by the peer server.

19. The system of claim 18 wherein after the customized peer application is installed by the user, updates for the peer application are automatically downloaded from the peer server, including additional affiliate low-resolution images.

20. The system of claim 13 wherein during execution, the customized peer application displays the low-resolution images in an album format.

21. The system of claim 20 wherein the customized peer application allows the user to select one or more of the low-resolution images and import and select their own images.

22. The system of claim 13 wherein the order includes metadata identifying selected low-resolution images.

23. The system of claim 22 wherein the order is processed by examining the metadata in the order and replacing any specified low-resolution images with corresponding high-resolution images for merchandise printing.

24. The system of claim 13 wherein the affiliate is paid a royalty based on usage of the affiliate images.

25. A method for distributing affiliate images in a peer-to-peer (P2P) photosharing network comprising multiple peer nodes and a peer server, wherein each of the peer nodes execute a peer application that allows the peer nodes to communicate with each other and with the peer server over a network, the method comprising:
establishing an affiliate relationship between the P2P photosharing network and a third-party affiliate that owns a set of images, whereby the affiliate provides the P2P photosharing network with low and high-resolution versions of the images;
customizing the peer application for the affiliate by branding the peer application with brand identifiers of the affiliate and by bundling the low resolution images of the affiliate with the customized peer application;
distributing the customized peer application to the affiliate's fan base;
in response to a user of one of the peer nodes selecting one or more of the low-resolution images and making an order to purchase merchandise made with the images, submitting the order to the peer server through the customized peer application; and
in response to the peer server receiving the order, replacing the affiliate low-resolution images specified in the order with high-resolution images prior to printing.

* * * * *